(12) United States Patent
McOmber

(10) Patent No.: US 7,814,849 B1
(45) Date of Patent: Oct. 19, 2010

(54) SEED TUBE FOR AN AGRICULTURAL PLANTER

(76) Inventor: Dean C. McOmber, 5966 Liberty Union Rd., VanWert, OH (US) 45891-9406

(*) Notice: Subject to any disclaimer, the term of this patent is extended or adjusted under 35 U.S.C. 154(b) by 0 days.

(21) Appl. No.: 12/390,698

(22) Filed: Feb. 23, 2009

(51) Int. Cl.
*A01C 7/00* (2006.01)
*A01C 9/00* (2006.01)

(52) U.S. Cl. ..................................... 111/174
(58) Field of Classification Search ............ 111/174, 111/170, 186–188, 127
See application file for complete search history.

(56) References Cited

U.S. PATENT DOCUMENTS

| | | | | |
|---|---|---|---|---|
| 3,653,550 | A * | 4/1972 | Williams | 222/136 |
| 4,373,455 | A * | 2/1983 | Friggstad | 111/150 |
| 4,417,530 | A * | 11/1983 | Kopecky | 111/73 |
| 4,446,801 | A * | 5/1984 | Machnee et al. | 111/152 |
| 5,033,398 | A * | 7/1991 | Froc | 111/152 |
| 5,351,635 | A * | 10/1994 | Hulicsko | 111/135 |
| 5,503,090 | A * | 4/1996 | Guzan | 111/7.2 |
| 5,522,328 | A * | 6/1996 | Long | 111/176 |
| 6,047,652 | A * | 4/2000 | Prairie et al. | 111/174 |
| 6,059,047 | A * | 5/2000 | Schimke | 172/769 |
| 6,178,901 | B1 * | 1/2001 | Anderson | 111/197 |
| 6,332,413 | B1 * | 12/2001 | Stufflebeanm et al. | 111/170 |
| 2004/0231575 | A1 * | 11/2004 | Wilkerson et al. | 111/127 |
| 2004/0244658 | A1 * | 12/2004 | Conrad et al. | 111/170 |
| 2005/0022706 | A1 * | 2/2005 | Johnston | 111/154 |
| 2007/0039529 | A1 * | 2/2007 | Sauder et al. | 111/174 |
| 2007/0266917 | A1 * | 11/2007 | Riewerts et al. | 111/200 |
| 2008/0011209 | A1 * | 1/2008 | Peterson et al. | 111/170 |
| 2008/0017088 | A1 * | 1/2008 | Mayerle | 111/174 |
| 2008/0229986 | A1 * | 9/2008 | Arksey | 111/12 |
| 2008/0236461 | A1 * | 10/2008 | Sauder et al. | 111/170 |

FOREIGN PATENT DOCUMENTS

EP 121045 A1 * 10/1984

* cited by examiner

*Primary Examiner*—Christopher J. Novosad
(74) *Attorney, Agent, or Firm*—Baker & Daniels LLP

(57) ABSTRACT

A seed tube having a front wall defining a portion of a seed pathway therethrough and having a concave interior surface having a first radius of curvature. The concave surface may extend only partially across the width of the front wall, such that a portion of the front wall lacks a substantially concave surface. Alternatively, the entirely of the front wall defining a portion of the seed pathway may have a concave surface. In this embodiment, the front wall has an asymmetrical cross-section. For example, a first portion of the concave surface may have a first radius of curvature and a second portion of the concave surface may have a second radius of curvature, with the second radius of curvature being greater than the first radius of curvature.

19 Claims, 6 Drawing Sheets

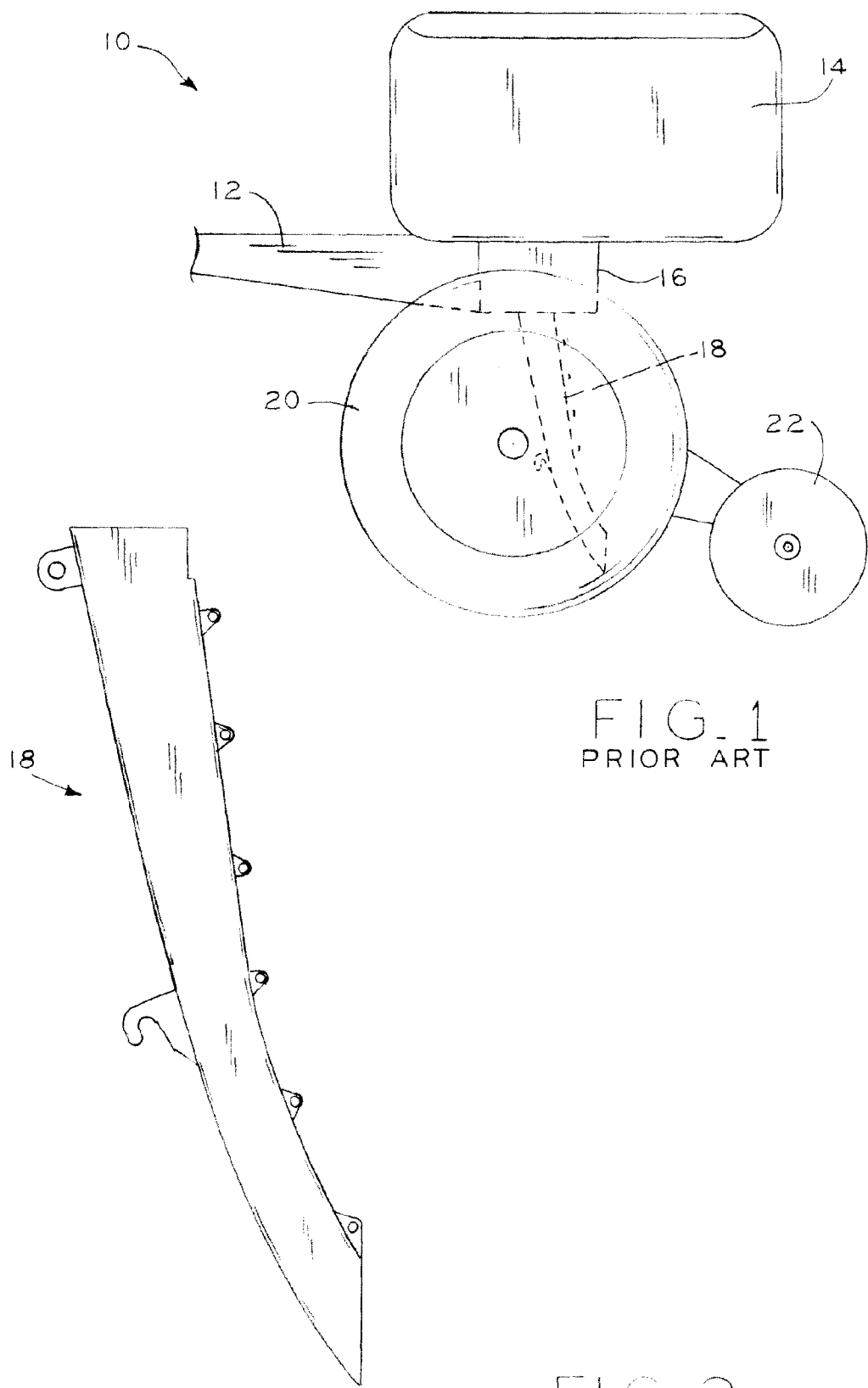
FIG_1
PRIOR ART
FIG_2
PRIOR ART

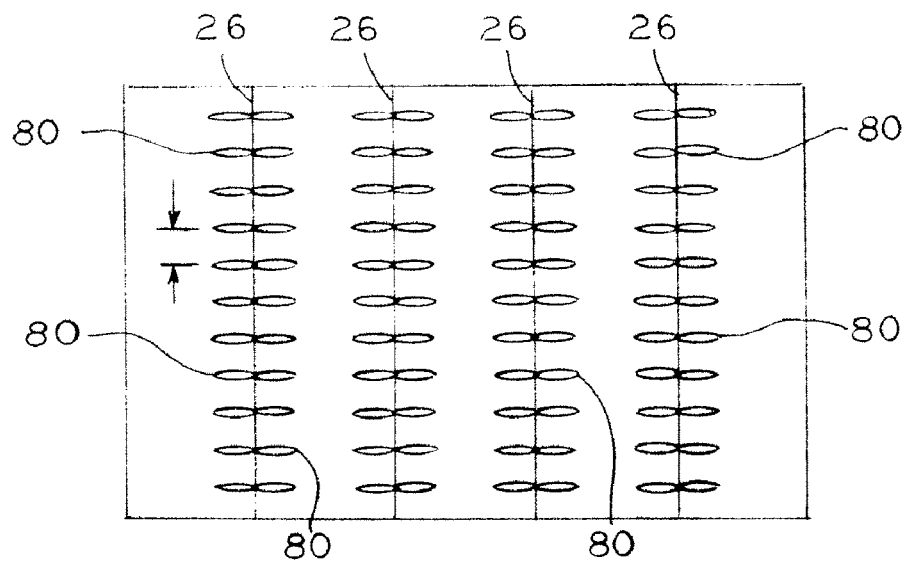
FIG_19
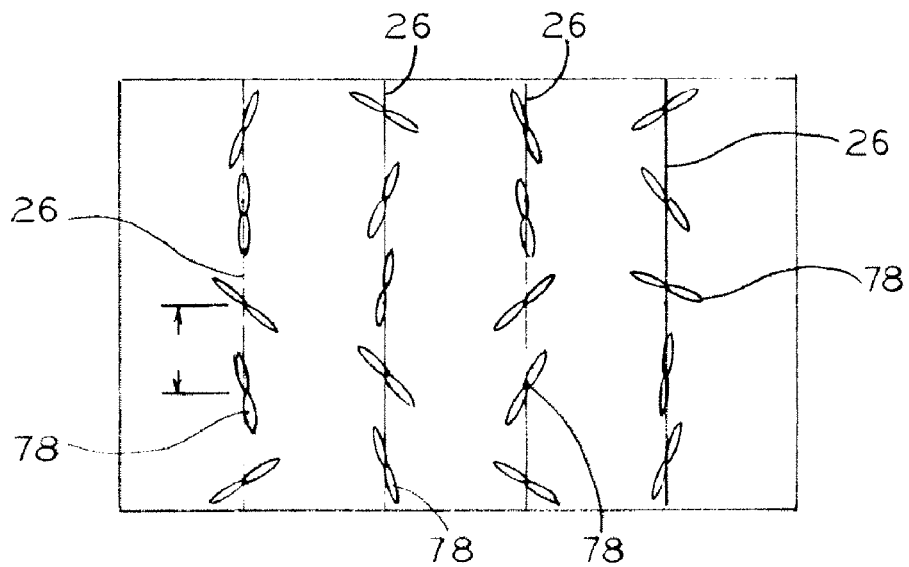
FIG_3
PRIOR ART

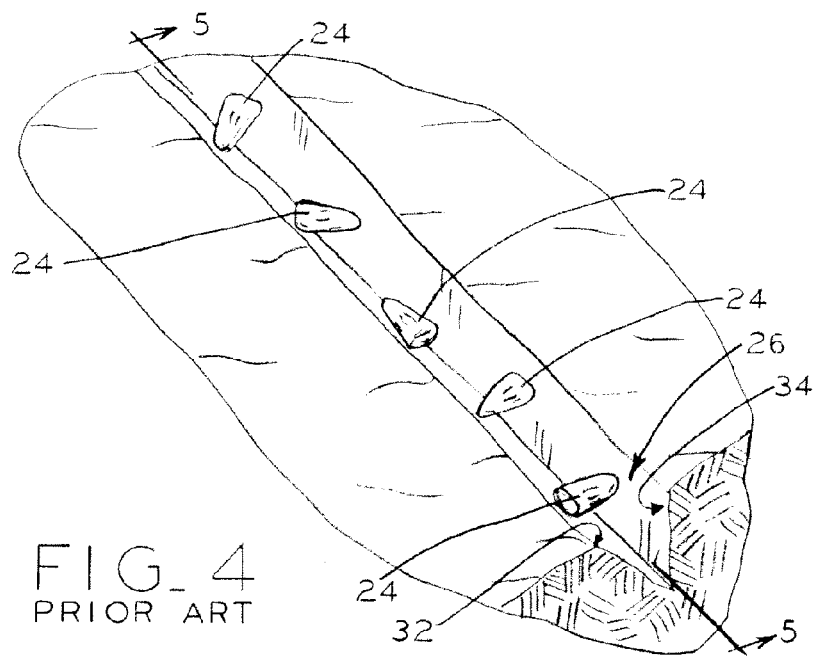
FIG_4
PRIOR ART
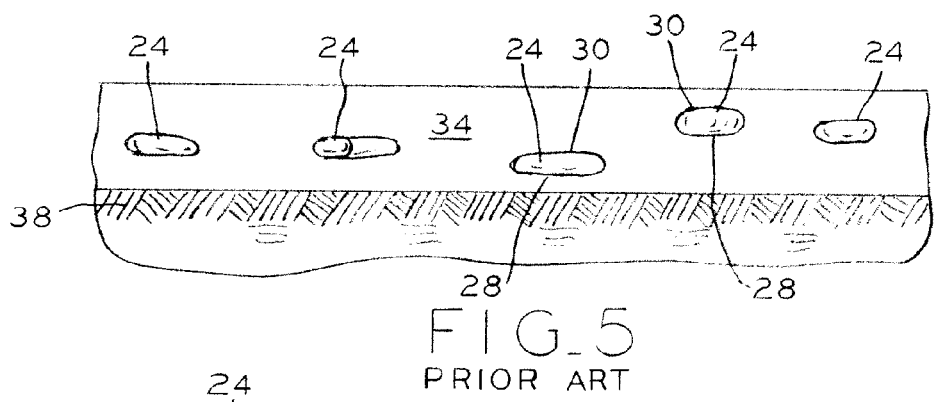
FIG_5
PRIOR ART
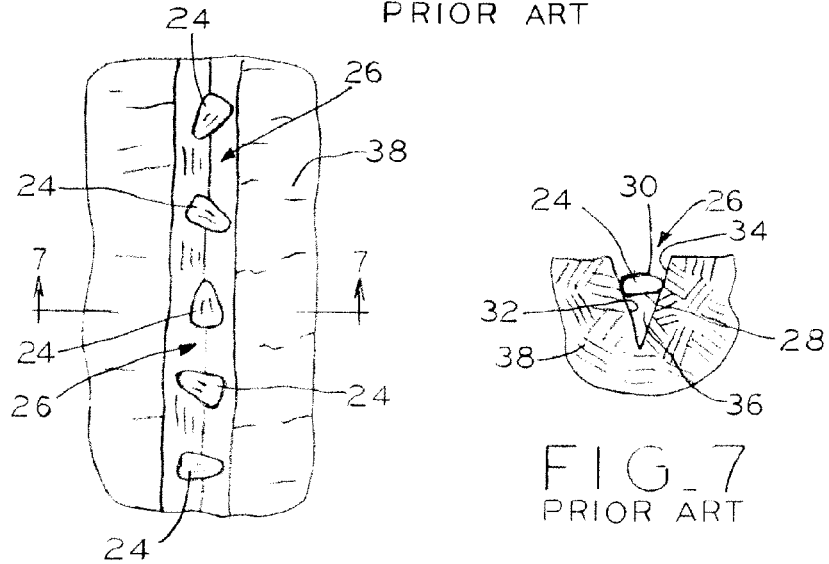
FIG_6
PRIOR ART
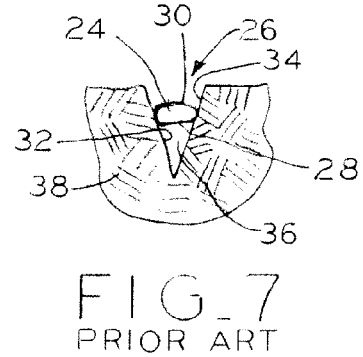
FIG_7
PRIOR ART

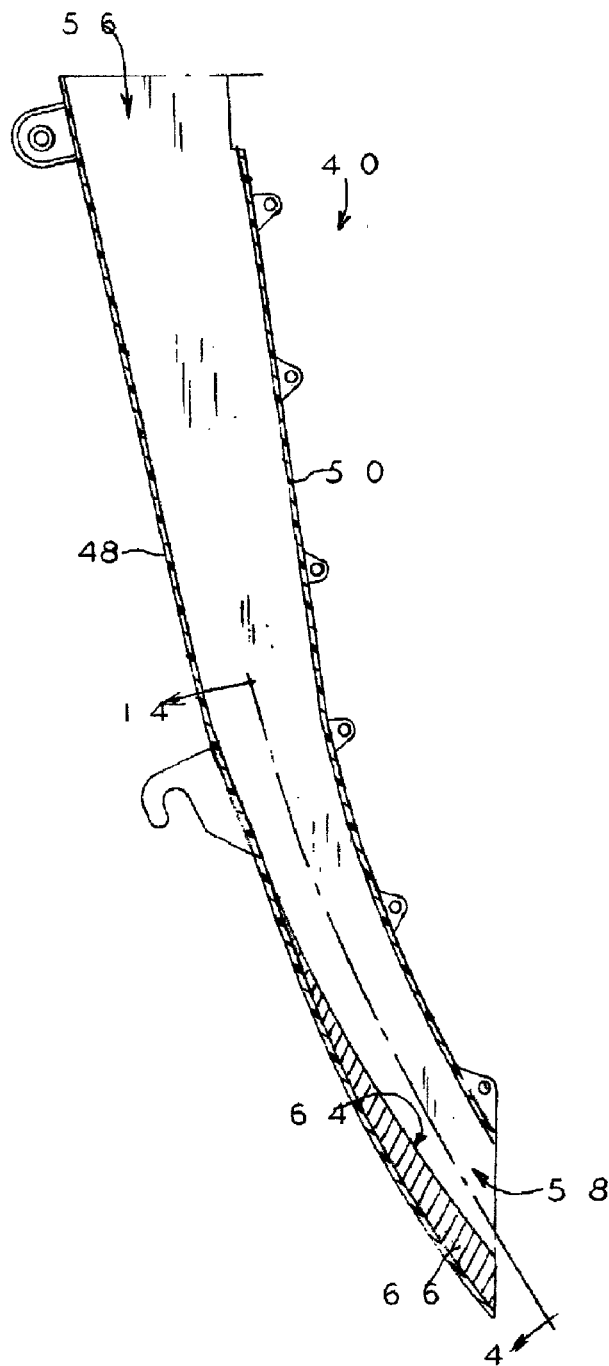
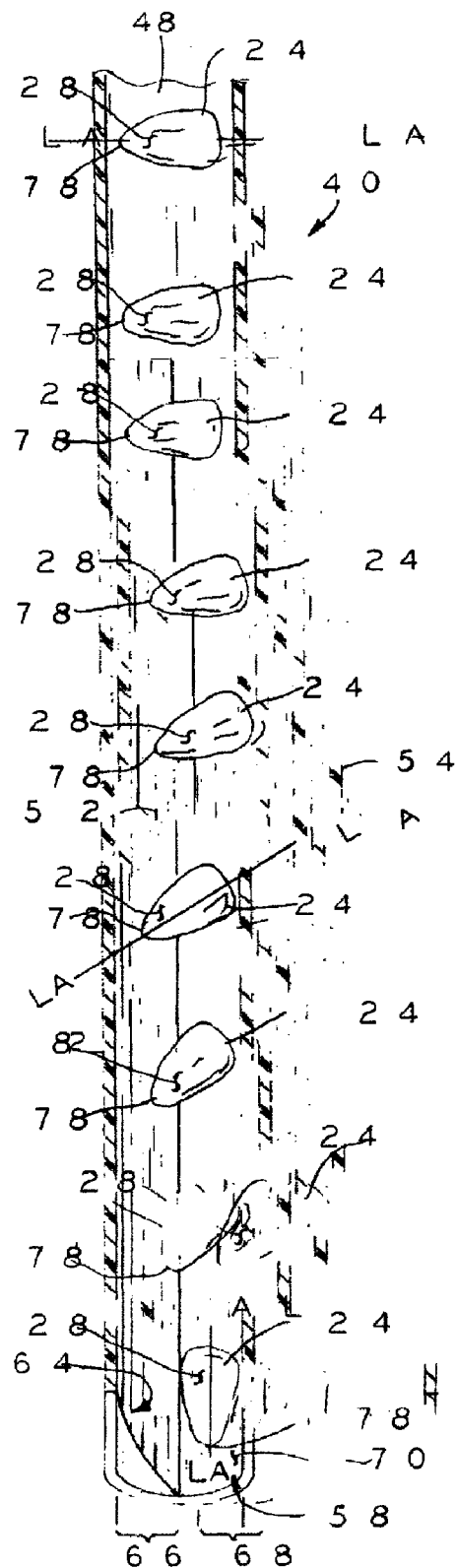
FIG. 13
FIG. 14

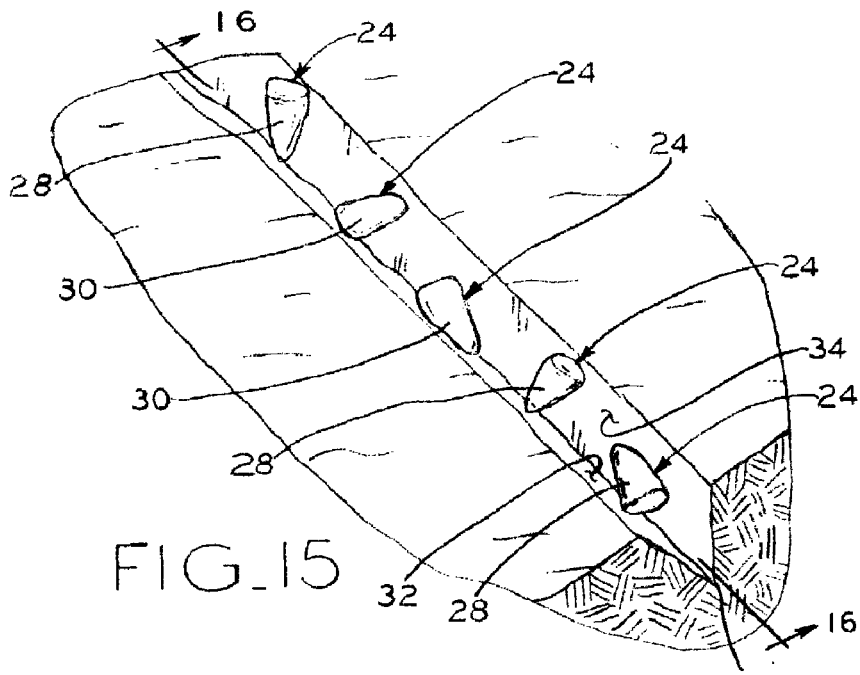
FIG_15
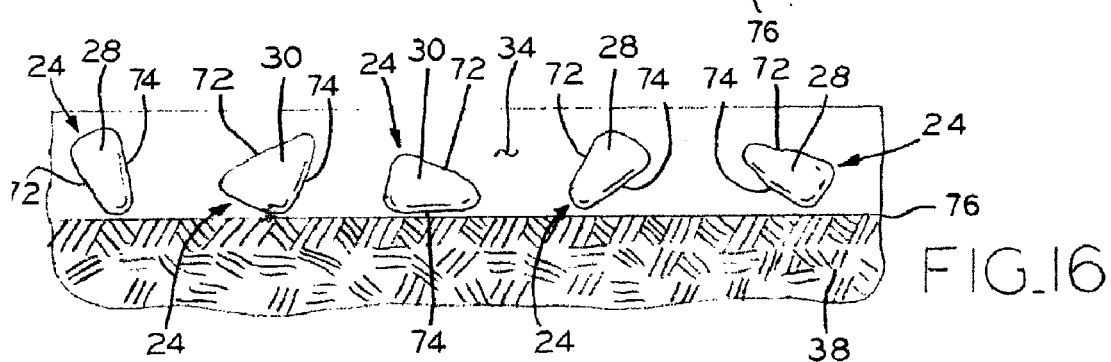
FIG_16
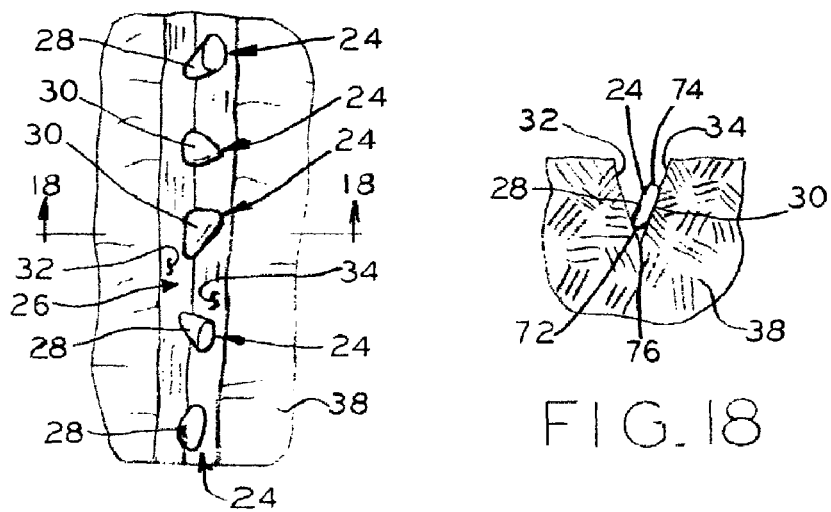
FIG_17
FIG_18

SEED TUBE FOR AN AGRICULTURAL PLANTER

BACKGROUND

1. Field of the Invention

The present invention relates to agricultural planters and, particularly, to seed tubes for use with an agricultural planter.

2. Description of the Related Art

Agricultural planters, such as agricultural planter 10, shown in FIG. 1, are commonly used in commercial farming operations to rapidly plant seeds in a field. As shown in FIG. 1, agricultural planter 10 includes frame 12 that may be connected to a tractor to advance agricultural planter 10 through the field. Seed reservoir 14, which holds the seeds that are to be planted, is positioned atop and secured to frame 12. Seed meter 16 is secured below seed reservoir 14. Seed meter 16 selects individual seeds, such as seeds 24 of FIG. 4, from seed reservoir 14 and advances the seeds into seed tube 18. The seeds travel through seed tube 18 and, upon exiting seed tube 18, are received in an open furrow in the ground.

In order to create a furrow, agricultural planter 10 includes double disk furrow opener 20, which is mounted to frame 12 and advanced with movement of agricultural planter 10. As double disk furrow opener 20 moves through the field, the rotating discs form a V-shaped seed planting furrow. Seed tube 18 is positioned such that it travels along the center of the newly opened furrow, allowing for a seed that has advanced through seed tube 18 to exit seed tube 18 and fall into the open furrow. With the seed now positioned in the furrow, additional advancement of agricultural planter 10 causes closing wheel 22, which is also mounted to frame 12, to push soil into the furrow created by double disk furrow opener 20 to close the furrow and complete the planting operation.

Referring to FIG. 2, seed tube 18 includes a relatively straight upper portion configured to be positioned adjacent seed meter 16 and a curvilinear lower portion from which the seeds exit seed tube 18 and are received within open furrow 26. The curved configuration of seed tube 18 helps to control the vertical velocity component of the seed as it gravitationally moves toward the exit of the tube and also minimizes or eliminates the horizontal velocity component of the seed as they are discharged into furrow 26. As a result, seeds that pass through seed tube 18 may exit from seed tube 18 with the horizontal velocity component being generally equal to and opposite from the horizontal velocity of agricultural planter 10 over the ground. Additionally, the lower portion of seed tube 18 may, at the exit of seed tube 18, have a rectangular cross-section.

While seed tube 18 compensates for the vertical and horizontal motion of a seed passing through seed tube 18, seeds discharged through seed tube 18 are positioned in furrow 26 in a randomized orientation, such that the seeds may not be in their most desirable positions for receipt within an open furrow upon discharge from seed tube 18. Specifically, referring to FIGS. 4-6, corn seeds 24 having broad and flat sides 28, 30 that have been placed within furrow 26 by seed tube 18 are shown. Seeds 24 are effectively randomly positioned within furrow 26, such that seeds 24 are not consistently placed in any position. For example, as shown in FIG. 7, one of seeds 24 is positioned such that broad sides 28, 30 extend between opposing walls 32, 34 of furrow 26, resulting in the formation of gap 36 between ground 38 and broad side 28 of seed 24. Other seeds 24 are positioned in any of an infinite number of positions in a randomized fashion.

SUMMARY

The present invention relates to agricultural planters and, particularly, to seed tubes for use with the same. In one exemplary embodiment, the seed tube of the present invention has an elongate housing with a front wall, a rear wall, a first side wall, and a second side wall that cooperate to define a seed pathway. Additionally, the housing includes a substantially straight upper portion and a curvilinear lower portion. The upper portion of the housing defines an entrance to the seed pathway, while the lower portion defines an exit from the seed pathway. As a result, seeds enter the upper portion of the seed tube, pass through the seed pathway, and exit from the lower portion of the seed tube.

A portion of the front wall extending along the lower portion of the housing and defining the seed pathway has a concave interior surface having a first radius of curvature. The concave surface may extend only partially across the width of the front wall, such that a portion of the front wall lacks a substantially concave surface. Alternatively, the entirety of the front wall defining a portion of the seed pathway may have a concave surface. In this embodiment, a first portion of the concave surface has a first radius of curvature and a second portion of the concave surface has a second radius of curvature, with the second radius of curvature being greater than the first radius of curvature.

In operation, when a seed having at least one broad side is advanced through the seed tube, the seed may contact a concave surface of the front wall of the seed tube, forcing the seed onto its broad side and toward the portion of the front wall that lacks the concave surface or, alternatively, that has an increased radius of curvature. Additionally, if a seed contacts the concave surface of the front wall, the seed may be rotated such that the point of the seed, which generally lies on the longitudinal axis of the seed, is substantially aligned with the longitudinal axis of the seed tube. In this manner, seeds are more consistently discharged from the seed tube into a furrow in a manner such that the seed will more consistently land with the broad side of the seed in contact one of the walls defining a V-shaped furrow.

Advantageously, when a corn seed, which has a pair of opposing substantially broad and flat sides separated by a pair of edges, is positioned within a V-shaped furrow with the substantial entirety of one of the broad sides of the corn seed in contact with a wall defining the V-shaped furrow, the resulting corn plant will grow such that the leaves of the plant will be positioned substantially perpendicular to the furrow. By consistently planting the corn seeds in this manner, each corn plant will have leaves that grow into a position in which the leaves are substantially perpendicular with the furrow and, as a result, the corn plants will be consistently aligned with one another in a similar manner. This alignment allows for more sunlight to reach the plants and also conserves ground moisture by providing for systematic shading of the ground surface by the leaves of the plants. Additionally, by planting corn seeds in this manner, a more uniform plant population with no "misses", i.e., areas where plants have not grown, may be created and, in one exemplary embodiment, the spacing between each corn plant may also be decreased.

In one form thereof, a seed tube for use with an agricultural planter, the seed tube including: an elongate housing having a front wall, a rear wall, a first sidewall, and a second sidewall cooperating to define a seed pathway, the housing having a substantially straight upper portion and a curvilinear lower portion, the upper portion defining an entrance to the seed pathway and the lower portion defining an exit from the seed pathway; a portion of the front wall extending along the lower portion of the housing having a first partial width portion and a second partial width portion cooperating to define the overall width of the front wall between the first sidewall and the second side wall, the first partial width portion extending between the first sidewall and the second partial width portion, the first partial width portion defining a concave surface extending along the seed pathway and having a first radius of curvature defined from a center, the center of the first radius of curvature being one of on a midline defining a junction between the first partial width portion and the second partial width portion and offset from the midline in the direction of the second side wall; wherein, if a seed entering the seed tube through the entrance travels through the upper portion of the housing and enters the lower portion of the housing contacting the first partial width portion of the front wall, the seed is rotated into a position in which the seed is substantially entirely positioned within the second partial width portion.

In another form thereof, the present invention provides a seed tube for use with an agricultural planter, the seed tube including: an elongate housing having a front wall, a rear wall, a first sidewall, and a second sidewall cooperating to define a seed pathway, the housing having a substantially straight upper portion and a curvilinear lower portion, the upper portion defining an entrance to the seed pathway and the lower portion defining an exit from the seed pathway; a portion of the front wall extending along the lower portion of the housing having a first partial width portion and a second partial width portion cooperating to define the overall width of the front wall between the first sidewall and the second side wall, the first partial width portion extending between the first sidewall and the second partial width portion, the first partial width portion defining a first concave surface extending along the seed pathway and having a first radius of curvature, the second partial width portion defining a second concave surface extending along the seed pathway and having a second radius of curvature, wherein the second radius of curvature is greater than the first radius of curvature.

In yet another form thereof, the present invention provides a seed tube for use with an agricultural planter, including: an elongate housing having a front wall, a rear wall, a first sidewall, and a second sidewall cooperating to define a seed pathway, the housing defining a longitudinal axis and having a substantially straight upper portion and a curvilinear lower portion, the upper portion defining an entrance to the seed pathway and the lower portion defining an exit from the seed pathway; the seed pathway having an asymmetric cross-section taken at the exit of the lower portion in a direction perpendicular to the longitudinal axis of the housing.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a fragmentary, side elevational view of an agricultural planter of the prior art;

FIG. 2 is a side elevational view of a seed tube of the prior art;

FIG. 3 is a fragmentary plan view of a portion of a field depicting corn plants planted utilizing the seed tube of the prior art;

FIG. 4 is a fragmentary, partial cross-sectional, perspective view of corn seeds within a furrow formed in the ground;

FIG. 5 is a cross-sectional view of the corn seeds and furrow of FIG. 4 taken along line 5-5 of FIG. 4;

FIG. 6 is a fragmentary, plan view of the corn seeds and furrow of FIG. 4;

FIG. 7 is a fragmentary, cross-sectional view of the corn seeds and furrow of FIG. 6 taken along line 7-7 of FIG. 6;

FIG. 13 is a cross-sectional view of the seed tube of FIG. 8 taken along line 13A-13A of FIG. 8 in the direction of line 13B-13B of FIG. 10;

FIG. 14 is a fragmentary, cross-sectional view of the seed tube of FIG. 8 taken along line 14-14 of FIG. 13;

FIG. 15 is a fragmentary, partial cross-sectional, perspective view of corn seeds positioned within a V-shaped furrow;

FIG. 16 is a cross-sectional view of the corn seeds and furrow of FIG. 15 taken along line 16-16 of FIG. 15;

FIG. 17 is a fragmentary, plan view of the corn seeds and furrow of FIG. 15;

FIG. 18 is a fragmentary, cross-sectional view of the seeds and furrow of FIG. 17 taken along line 18-18 of FIG. 17; and FIG. 19 is a fragmentary plan view of a section of a field having corn seeds planted using the seed tube of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION

Figure 8:
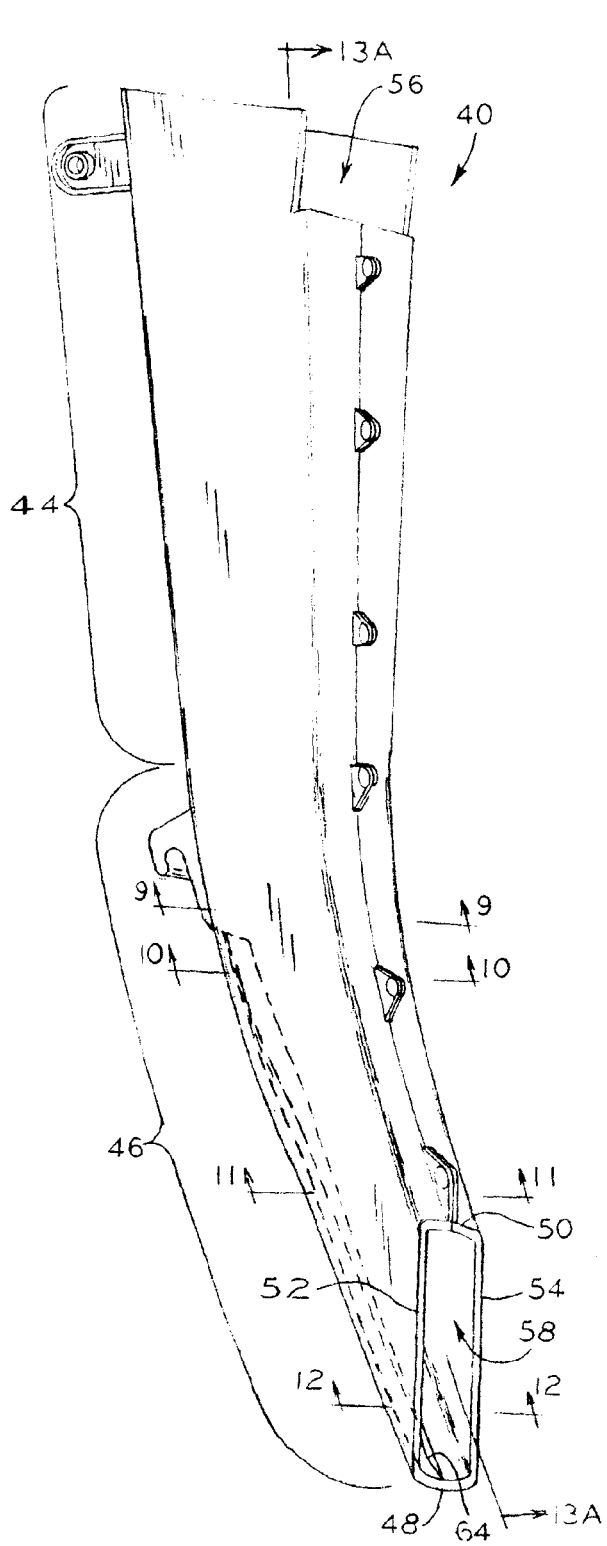
FIG. 8 is a perspective view of a seed tube according to the exemplary embodiment of the present invention.
Figure 9:
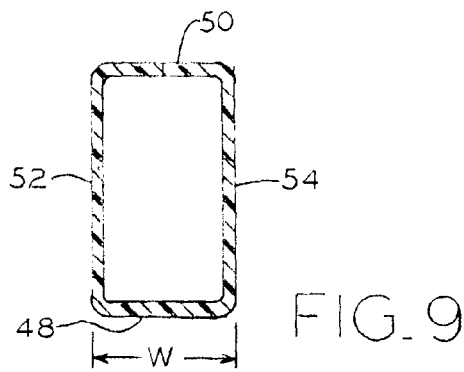
FIG. 9 is a cross-sectional view of the seed tube of FIG. 8 taken along line 9-9 of FIG. 8.
Figure 10:
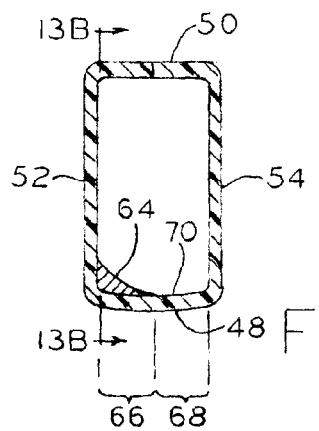
FIG. 10 is a cross-sectional view of the seed tube of FIG. 8 taken along line 10-10 of FIG. 8.
Figure 11:
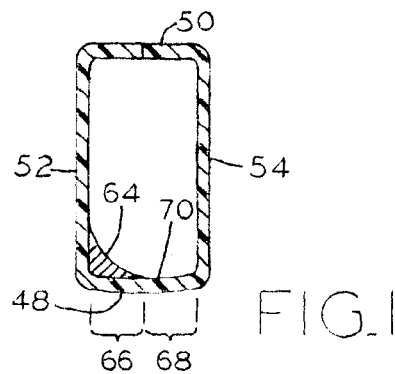
FIG. 11 is a cross-sectional view of the seed tube of FIG. 8 taken along line 11-11 of FIG. 8.

Referring to FIG. 8, an exemplary seed tube manufactured according to the present invention is shown as seed tube 40. Seed tube 40 is configured to be used with an agricultural planter, such as agricultural planter 10 in a substantially similar manner as seed tube 18 described above. Thus, seed tube 40 may be substituted for seed tube 18. By utilizing seed tube 40, seeds having at least one broad and flat side, such as corn seeds 24 (FIG. 15), may be positioned such that the seeds exit seed tube 40 in a manner that substantially increases the probability that, upon landing in an open furrow, substantially all of a broad side of the seed will contact a soil wall defining a portion of the open furrow, as described in detail below. As indicated above, when a seed having at least one broad side, such as a corn seed 24, is planted within a furrow with substantially all of a broad side of the seed in contact with a wall of soil defining the open furrow, the leaves of the resulting corn plant will be positioned such that each leaf is perpendicular to the furrow. As a result of seed tube 40 consistently positioning corn seeds 24 in this manner, i.e., such that substantially all of a broad side of seeds 24 are in contact with the soil defining open furrow 26 (FIG. 15), corn plants 80 grown from the seeds, shown in FIG. 19, will have leaves that are substantially perpendicular to the furrow.

As shown in FIG. 8, seed tube 40 includes elongate housing 42 having substantially straight upper portion 44 and curvilinear lower portion 46. Additionally, housing 42 includes front wall 48, rear wall 50, first side wall 52, and second side wall 54. Walls 48, 50, 52, 54 cooperate to define a seed pathway that extends through housing 42. Specifically, upper portion 44 of housing 42 defines entrance 56 for the receipt of a seed from seed reservoir 14 via seed meter 16 (FIG. 1). Similarly, lower portion 46 of housing 42 defines exit 58 through which a seed passing through the seed pathway exits seed tube 18 and enters open furrow 26 (FIG. 15) formed in the ground.

In order to properly position a seed having a broad side, such as corn seeds 24, within an open furrow, such that a broad side of the seed is positioned adjacent to a wall defining a V-shaped furrow, housing 42 has an asymmetrical cross-section at exit 58 taken in a direction perpendicular to a longitudinal axis of housing 42. For example, a portion of front wall 48 of lower portion 46 of housing 42 may define concave surface 64 extending along the seed pathway. Stated another way, a concave corner is defined between second side wall 54 and front wall 48 of seed tube 40, while a broadly radiused concave surface merges first side wall 52 and front wall 48 of seed tube 40. In one exemplary embodiment, front wall 48 includes two adjacent portions, first partial width portion 66 and second partial width portion 68. First and second partial width portions 66, 68 cooperate to define width W of front wall 48 at any given position between first side wall 52 and second side wall 54. First partial width portion 66 extends from first side wall 52 to second partial width portion 68, while second partial width portion 68 extends from first partial width portion 66 to second side wall 54. First partial width portion 66 may have a width that is greater than a width of second partial width portion 68 measured in a cross-section taken perpendicular to the longitudinal axis of seed tube 40.

Alternatively, the widths of first partial width portion 66 and second partial width portion 68 may be substantially equal. In addition, the width of first partial width portion 66 may increase in the direction of exit 58 of seed tube 40, while, correspondingly, the width of second partial width portion 68 may decrease in the direction of exit 58 of seed tube 40. Stated another way, the width of first partial width portion 66 may be less then the width of second partial width portion 68 when measured in a cross-section taken in a direction perpendicular to the longitudinal axis of seed tube 40 at a position spaced longitudinally from exit 58 of seed tube 40, but the width of first partial width portion 66 may be greater than the width of second partial width portion 68 when measured in a cross-section taken in a direction perpendicular to the longitudinal axis of seed tube 40 at exit 58 of seed tube 40.

Figure 12:
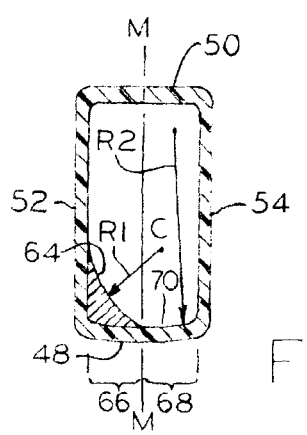
FIG. 12 is a cross-sectional view of the seed tube of FIG. 8 taken along line 12-12 of FIG. 8.
Figure 8:
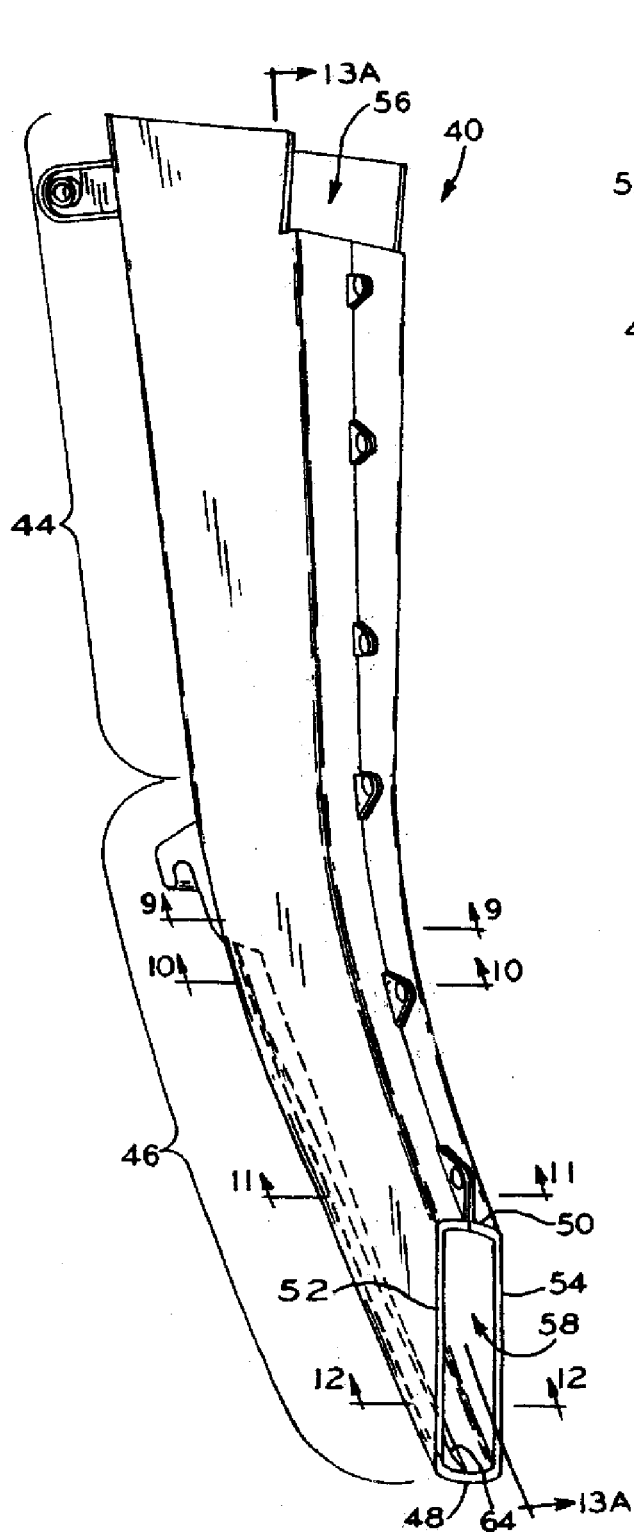
Figure 9:
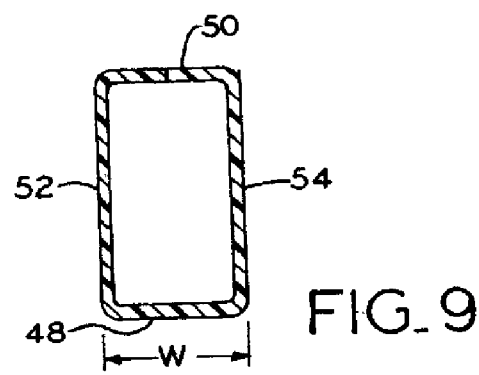
Figure 10:
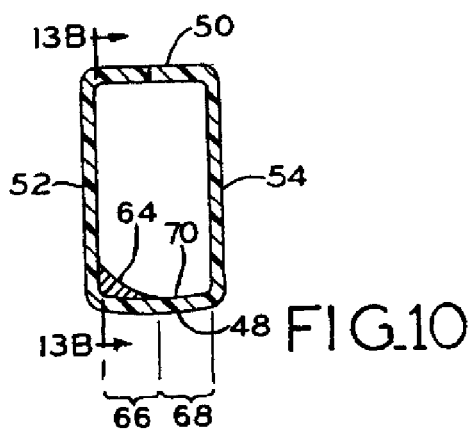
Figure 11:
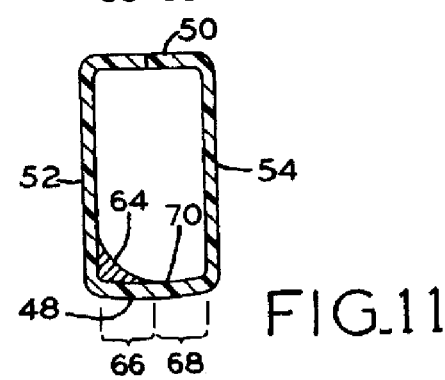
Figure 12:
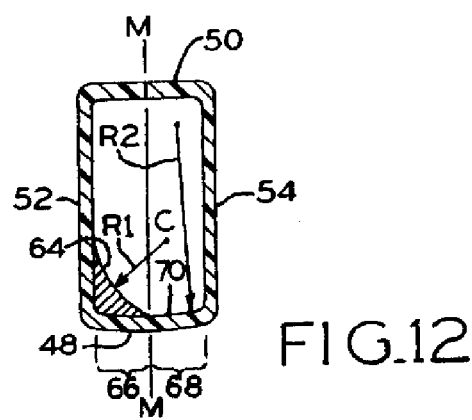

First partial width portion 66 of front wall 48 defines concave surface 64 of front wall 48 extending along the seed pathway. While described herein as being an integral component of seed tube 40, the concave surface of first partial width portion 66 may be defined by a separate insert component that is secured within seed tube 40, such as by a snap-fit or interference fit with the walls of seed tube 40. In this manner, a prior art seed tube, such as seed tube 18, may be readily converted to a seed tube the incorporates the concepts of the present invention, such as seed tube 40. Concave surface 64 may have a first radius of curvature R1 defined from center C, shown in FIG. 12, that is positioned either on a midline M defining the junction between first partial width portion 66 and second partial width portion 68, or that is offset in the direction of second side wall 54 from the midline defining the junction between first partial width portion 66 and second partial width portion 68.

Referring to FIGS. 9-12, concave surface 64 of first partial width portion 66 of front wall 48 may include a progressive radius of curvature R1, such that, as front wall 48 advances in the direction of exit 58, radius of curvature R1 of concave surface 64 of first partial width portion 66 progressively decreases, resulting in a greater curvature of concave surface 64 of front wall 48 adjacent to exit 58. Stated another way, in this embodiment, first partial width portion 66 has a first radius of curvature at exit 58 of seed tube 40 and a second radius of curvature at a position spaced longitudinally away from exit 58 of seed tube 40, with the second radius of curvature being greater than the first radius of curvature. In another exemplary embodiment, first partial width portion 66 of front wall 48 has a substantially constant radius of curvature R1 along it entire length.

In contrast to first partial width portion 66, second partial width portion 68 may be substantially planar. Alternatively, second partial width portion 68 may define second concave surface 70 of front wall 48 extending along the seed pathway. In this embodiment, second concave surface 70 may have a radius of curvature R2 that is greater than radius of curvature R1 of concave surface 64 of first partial width portion 66.

Advantageously, by utilizing first partial width portion 66 having first radius of curvature R1 defining concave surface 64 along the portion of the seed pathway defined by front wall 48 in conjunction with second partial width portion 68, as described in detail above, a seed having a broad side, such as corn seed 24 with opposing broad sides 28, 30 (FIG. 18), that is advancing through seed tube 40 tends to be rotated upon contact with concave surface 64, such that the seed is resting on a broad side or on edge in a manner in which the broad sides of the seed are substantially parallel with the longitudinal axis of seed tube 40, and with the seed is positioned substantially within second partial width portion 68 upon discharge from seed tube 40. In addition, when one of the ends of a seed having a broad side, such as corn seed 24, contacts concave surface 64, the end of the seed contacting concave surface 64 is lifted, such that a middle portion of the seed does not contact concave surface 64. As a result, the friction between front wall 48 of seed tube 40 and the seed is lessened, allowing the seed to more readily pass through seed tube 40.

Referring to FIG. 14, corn seed 24 is shown. As corn seed 24, having a pair of opposing broad sides 28, 30, enters seed tube 40 and advances therethrough, a portion of seed 24 may contact first partial width portion 66 and concave surface 64 defined by the same. As a result, seed 24 will begin to be progressively rotated as seed 24 advances along concave surface 64 in the direction of exit 58, ultimately rotating into the position shown at the bottom of FIG. 14. In this position, seed 24 is substantially entirely within second partial width portion 68 with point 78 of seed 24 parallel with the longitudinal axis of seed tube 40. Stated another way, seed 24 is substantially entirely within second partial width portion 68 with longitudinal axis LA of seed 24 aligned with the longitudinal axis of seed tube 40. Additionally, by encountering concave surface 64 defined by first partial width portion 66, seed 24 may also be rotated about longitudinal axis LA until seed 24 is position on one of edges 72, 74, such that broad sides 28, 30 of seed 24 are substantially parallel with the longitudinal axis of seed tube 40. At this point, as described in detail below and shown in FIGS. 15-18, seed 24 may exit seed tube 40 and enter into open furrow 26 in a manner such that one of broad sides 28, 30 of seed 24 has a substantially increased probability of contacting one of walls 32, 34 defining open furrow 26.

Referring to FIGS. 15-18, as seed 24 exits seed tube 40 on one of edges 72, 74, such that broad sides 28, 30 of seed 24 are parallel with the longitudinal axis of seed tube 40, edge 72 of seed 24 that is in contact with second partial width portion 68 should land adjacent to the nadir, or low point 76, of furrow 26 formed in ground 38. Once in this position, seed 24 may fall to either side of furrow 26, such that one of broad sides 28, 30 lies in substantially continuous contact with one of walls 32, 34 defining V-shaped furrow 26, as shown in FIG. 18. Similarly, if a seed 24 exits seed tube 40 with one of broad sides 28, 30 in contact with second partial width portion 68 and longitudinal axis LA of seed 24 aligned with the longitudinal axis of furrow 26, the one of broad sides 28, 30 in contact with second partial width portion 68 should land in furrow 26 such that the one of broad sides 28, 30 is in substantially continuous contact with one of walls 32, 34 defining furrow 26. Stated another way, seed 24 may exit seed tube 40 with point 78 of seed 24 positioned in any rotational orientation, such that point 78 extends along a substantially vertical plane extending both through low point 76 of furrow 26 and between walls 32, 34 of furrow 26, such that broad sides 28, 30 of seed 24 are coplanar with the substantially vertical plane.

Referring to FIGS. 15-18, a plurality of seeds 24 that have passed through seed tube 40 are shown in FIG. 15 positioned within open furrow 26 that has been formed in ground 38. As shown in FIGS. 15-18, one of broad side 28, 30 of each of seeds 24 is in substantially continuous contact with one of walls 32, 34 defining furrow 26.

Additionally, while seeds 24 are not all rotationally aligned in a similar manner, i.e., longitudinal axes LA of all of seeds 24 are not aligned with the longitudinal axis of furrow 26, one of broad sides 28, 30 of seeds 24 are positioned adjacent to and in substantially continuous contact with one of walls 28, 30 of furrow 26. As a result, the use of seed tube 40 results in an substantially decreased probability that seeds, such as seeds 24, may enter furrow 26 and land in a position similar to that shown in FIG. 7.

Advantageously, as indicated above, when corn seeds 24 are positioned within furrow 26 with the substantial entirety of one of broad sides 28, 30 in contact with one of walls 32, 34 defining furrow 26, the resulting corn plant will grow such that the leaves of the plant will be positioned to form an approximately 90 degree angle with the longitudinal axis of furrow 26. By consistently planting seeds 24 in this manner, each corn plant will have leaves that grow into a position in which the leaves form an approximately 90 degree angle with the longitudinal axis of furrow 26 and, as a result, corn plants 80, shown in FIG. 19, will be consistently aligned with one another in a similar manner. This alignment allows for more sunlight to reach the plants and also conserves ground moisture by providing for systematic shading of the ground surface by the leaves of the plants. Additionally, by planting corn seeds 24 in this manner, a more uniform plant population with no "misses", i.e., areas where plants have not grown, may be created and, in one exemplary embodiment, the spacing between each corn plant may also be decreased.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seed tube for use with an agricultural planter, the seed tube comprising:

an elongate housing having a front wall, a rear wall, a first sidewall, and a second sidewall cooperating to define a seed pathway, said housing defining a longitudinal axis and having a substantially straight upper portion and a curvilinear lower portion, said upper portion defining an entrance to said seed pathway and said lower portion defining an exit from said seed pathway, said seed pathway having an asymmetric cross-section taken at said exit of said lower portion in a direction perpendicular to said longitudinal axis of said housing;

a portion of said front wall extending along said lower portion of said housing having a first partial width portion and a second partial width portion cooperating to define the overall width of said front wall between said first sidewall and said second side wall, said first partial width portion extending between said first sidewall and said second partial width portion, said first partial width portion defining a concave surface extending along said seed pathway and having a first radius of curvature defined from a center, said center of said first radius of curvature being one of on a midline defining a junction between said first partial width portion and said second partial width portion and offset from said midline in the direction of said second side wall;

wherein, if a seed entering the seed tube through said entrance travels through said upper portion of said housing and enters said lower portion of said housing contacting said first partial width portion of said front wall, the seed is rotated into a position in which the seed is substantially entirely positioned within said second partial width portion.

2. The seed tube of claim 1, wherein said second partial width portion defines a concave surface extending along said seed pathway and having a second radius of curvature.

3. The seed tube of claim 2, wherein said second radius of curvature is greater than said first radius of curvature.

4. The seed tube of claim 1, wherein said second partial width portion defines a substantially planar surface extending along said seed pathway.

5. The seed tube of claim 1, wherein said first partial width portion has a first width and said second partial width portion has a second width measured in a cross-section taken perpendicular to a longitudinal axis of said seed tube, and wherein said first width is greater than said second width at said exit of said seed tube.

6. The seed tube of claim 5, wherein said first width of said first partial width portion is less than said second width of said second partial width portion at a position longitudinally spaced from said exit of said seed tube in the direction of said entrance of said seed tube.

7. The seed tube of claim 1, said first partial width portion has a first radius of curvature at said exit of said seed tube and a second radius of curvature at a position spaced longitudinally away from said exit of said seed tube in the direction of said entrance of said seed tube, said second radius of curvature being greater than said first radius of curvature.

8. The seed tube of claim 1, said first partial width portion has a first radius of curvature at said exit of said seed tube and a third radius of curvature at a position spaced longitudinally away from said exit of said seed tube in the direction of said entrance of said seed tube, said third radius of curvature being greater than said first radius of curvature.

9. The seed tube of claim 8, wherein said second radius of curvature of said second partial width portion is greater than both of said first radius of curvature of said first partial width portion and said third radius of curvature of said first partial width portion.

10. A seed tube for use with an agricultural planter, comprising:

an elongate housing having a front wall, a rear wall, a first sidewall, and a second sidewall cooperating to define a seed pathway, said front wall facing forwardly during use of said seed tube in said agricultural planter, said housing defining a longitudinal axis and having a substantially straight upper portion and a curvilinear lower portion, said upper portion defining an entrance to said seed pathway and said lower portion defining an exit from said seed pathway;

said seed pathway having an asymmetric cross-section taken at said exit of said lower portion about a mid-line extending though said front and rear walls, said mid-line disposed equidistant from said first and second sidewalls, wherein said front wall and one of said sidewalls together define a first concave surface at said exit of said seed tube.

11. The seed tube of claim 10 further comprising:

a portion of said front wall extending along said lower portion of said housing having a first partial width portion and a second partial width portion cooperating to define the overall width of said front wall between said first sidewall and said second sidewall, said first partial width portion extending between said first sidewall and said second partial width portion, said first partial width portion defining said first concave surface extending along said seed pathway and having a first radius of curvature, said second partial width portion defining a second concave surface extending along said seed pathway and having a second radius of curvature, wherein said second radius of curvature is greater than said first radius of curvature.

12. The seed tube of claim 11, wherein said first partial width portion has a first width and said second partial width portion has a second width measured in a cross-section taken perpendicular to a longitudinal axis of said seed tube, and wherein said first width is greater than said second width at said exit of said seed tube.

13. The seed tube of claim 12, wherein said first width of said first partial width portion is less than said second width of said second partial width portion at a position longitudinally spaced from said exit of said seed tube in the direction of said entrance of said seed tube.

14. The seed tube of claim 10 further comprising:

said front wall of said housing having a first partial width portion and a second partial width portion, said first partial width portion defining said first concave surface extending along said seed pathway, said first concave surface having a first radius of curvature at said exit of said seed tube and a second radius of curvature at a position spaced longitudinally away from said exit of said seed tube in a direction toward said entrance of said seed tube, said second radius of curvature being greater than said first radius of curvature.

15. The seed tube of claim 14, wherein said second partial width portion defines a substantially planar surface extending along said seed pathway.

16. The seed tube of claim 14, wherein said first partial width portion has a first width and said second partial width portion has a second width measured in a cross-section taken perpendicular to a longitudinal axis of said seed tube, and wherein said first width is greater than said second width at said exit of said seed tube.

17. The seed tube of claim 14, wherein said first width of said first partial width portion is less than said second width of said second partial width portion at a position longitudinally spaced from said exit of said seed tube in the direction of said entrance of said seed tube.

18. The seed tube of claim 10 further comprising:

said front wall of said housing having a first partial width portion and a second partial width portion, said first partial width portion defining said first concave surface extending along said seed pathway and said second partial width portion defining a second concave surface extending along said seed pathway and having a second radius of curvature, said second radius of curvature is greater than said first radius of curvature.

19. The seed tube of claim 10, wherein said first concave surface has a first radius of curvature at said exit of said seed tube and a second radius of curvature at a position spaced longitudinally away from said exit of said seed tube in a direction toward said entrance of said seed tube, said second radius of curvature being greater than said first radius of curvature.

* * * * *

UNITED STATES PATENT AND TRADEMARK OFFICE
CERTIFICATE OF CORRECTION

PATENT NO. : 7,814,849 B1
APPLICATION NO. : 12/390698
DATED : October 19, 2010
INVENTOR(S) : Dean C. McOmber It is certified that error appears in the above-identified patent and that said Letters Patent is hereby corrected as shown below:

The title page should be deleted to appear as per attached title page.

The sheets of drawing consisting of figures 1-19 should be deleted to appear as per attached figures 1-19.

Signed and Sealed this
Twenty-ninth Day of May, 2012

David J. Kappos
*Director of the United States Patent and Trademark Office*

(12) United States Patent
McOmber

(10) Patent No.: US 7,814,849 B1
(45) Date of Patent: Oct. 19, 2010

(54) SEED TUBE FOR AN AGRICULTURAL PLANTER

(76) Inventor: Dean C. McOmber, 5966 Liberty Union Rd., VanWert, OH (US) 45891-9406

( * ) Notice: Subject to any disclaimer, the term of this patent is extended or adjusted under 35 U.S.C. 154(b) by 0 days.

(21) Appl. No.: 12/390,698

(22) Filed: Feb. 23, 2009

(51) Int. Cl.
*A01C 7/00* (2006.01)
*A01C 9/00* (2006.01)

(52) U.S. Cl. .................................................. 111/174
(58) Field of Classification Search ............. 111/174, 111/170, 186, 188, 127
See application file for complete search history.

(56) References Cited

U.S. PATENT DOCUMENTS

| | | | |
|---|---|---|---|
| 3,653,550 A * | 4/1972 | Williams | 222/136 |
| 4,373,455 A * | 2/1983 | Friggstad | 111/150 |
| 4,417,530 A * | 11/1983 | Kopecky | 111/73 |
| 4,446,801 A * | 5/1984 | Machnee et al. | 111/152 |
| 5,033,398 A * | 7/1991 | Froc | 111/152 |
| 5,351,635 A * | 10/1994 | Hulicsko | 111/135 |
| 5,503,090 A * | 4/1996 | Guzan | 111/7.2 |
| 5,522,328 A * | 6/1996 | Long | 111/176 |
| 6,047,652 A * | 4/2000 | Prairie et al. | 111/174 |
| 6,059,047 A * | 5/2000 | Schimke | 172/769 |
| 6,178,901 B1 * | 1/2001 | Anderson | 111/197 |
| 6,332,413 B1 * | 12/2001 | Stufflebeam et al. | 111/170 |
| 2004/0231575 A1 * | 11/2004 | Wilkerson et al. | 111/127 |
| 2004/0244658 A1 * | 12/2004 | Conrad et al. | 111/170 |
| 2005/0022706 A1 * | 2/2005 | Johnston | 111/154 |
| 2007/0039529 A1 * | 2/2007 | Sauder et al. | 111/174 |
| 2007/0266917 A1 * | 11/2007 | Riewerts et al. | 111/200 |
| 2008/0011209 A1 * | 1/2008 | Peterson et al. | 111/170 |
| 2008/0017088 A1 * | 1/2008 | Mayerle | 111/174 |
| 2008/0229986 A1 * | 9/2008 | Arksey | 111/12 |
| 2008/0236461 A1 * | 10/2008 | Sauder et al. | 111/170 |

FOREIGN PATENT DOCUMENTS

EP 121045 A1 * 10/1984

\* cited by examiner

*Primary Examiner*—Christopher J. Novosad
(74) *Attorney, Agent, or Firm*—Baker & Daniels LLP

(57) ABSTRACT

A seed tube having a front wall defining a portion of a seed pathway therethrough and having a concave interior surface having a first radius of curvature. The concave surface may extend only partially across the width of the front wall, such that a portion of the front wall lacks a substantially concave surface. Alternatively, the entirely of the front wall defining a portion of the seed pathway may have a concave surface. In this embodiment, the front wall has an asymmetrical cross-section. For example, a first portion of the concave surface may have a first radius of curvature and a second portion of the concave surface may have a second radius of curvature, with the second radius of curvature being greater than the first radius of curvature.

19 Claims, 6 Drawing Sheets

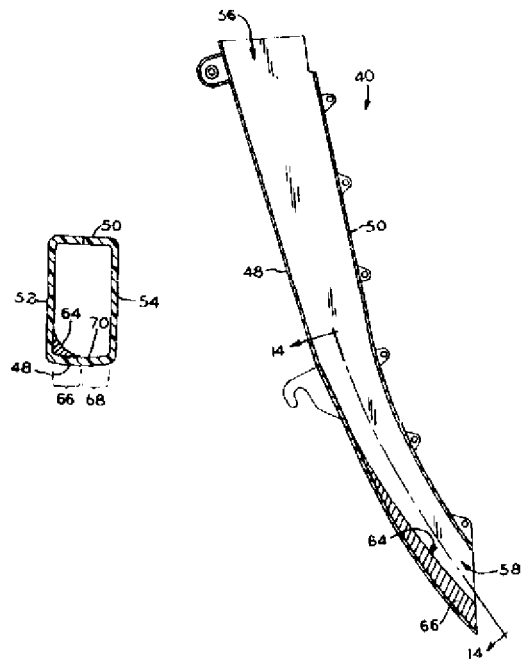

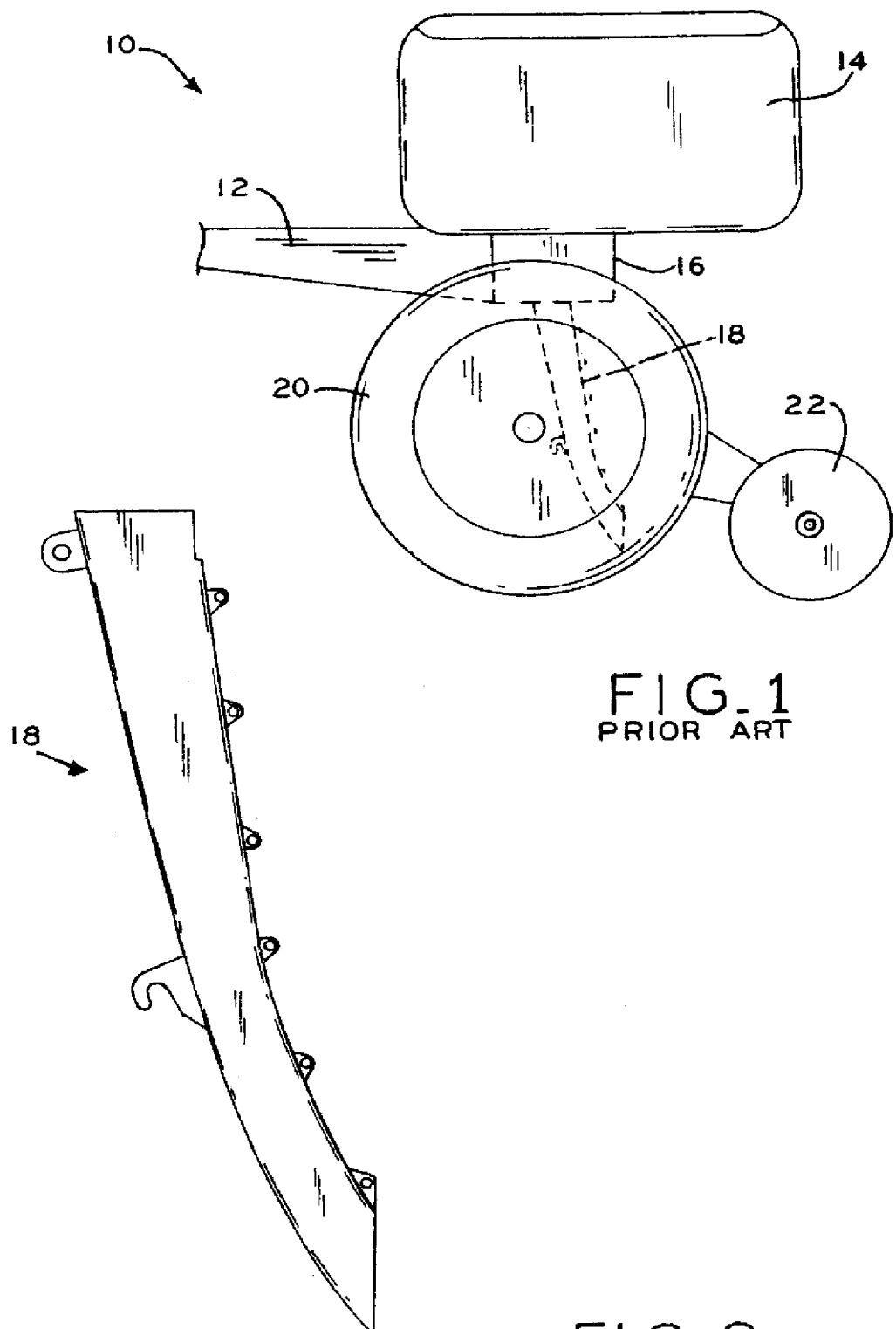

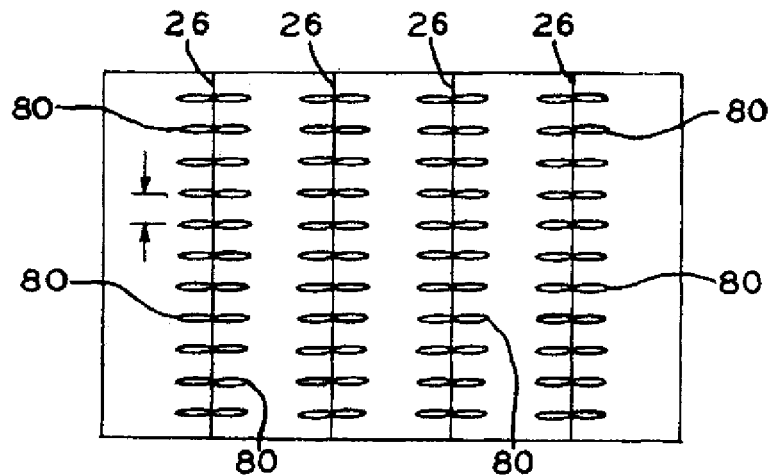
FIG_19
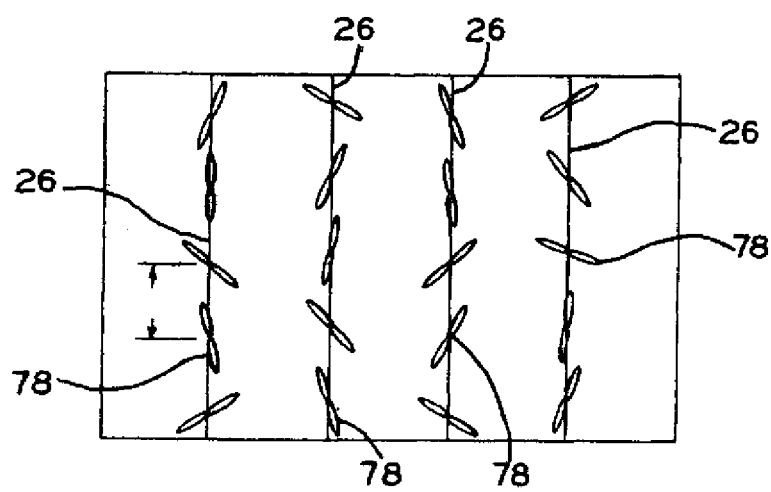
FIG_3
PRIOR ART

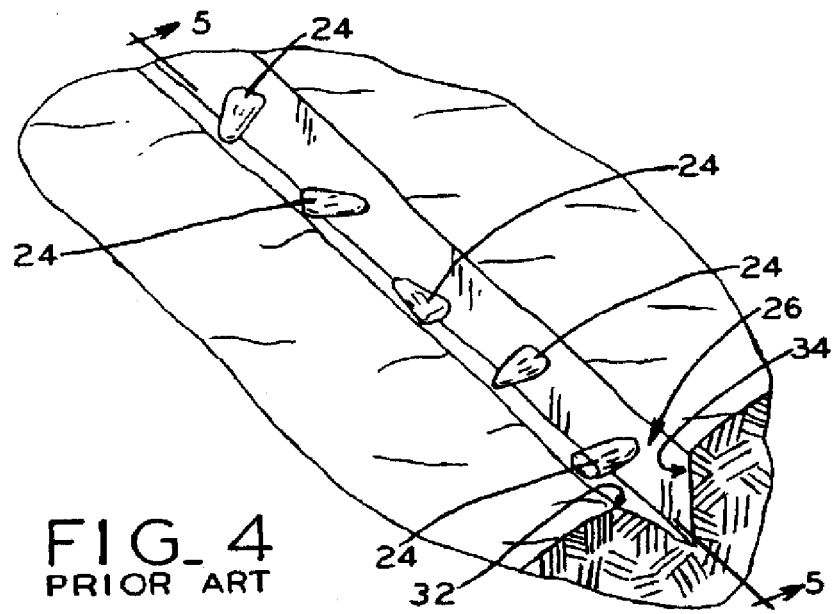
FIG_4
PRIOR ART
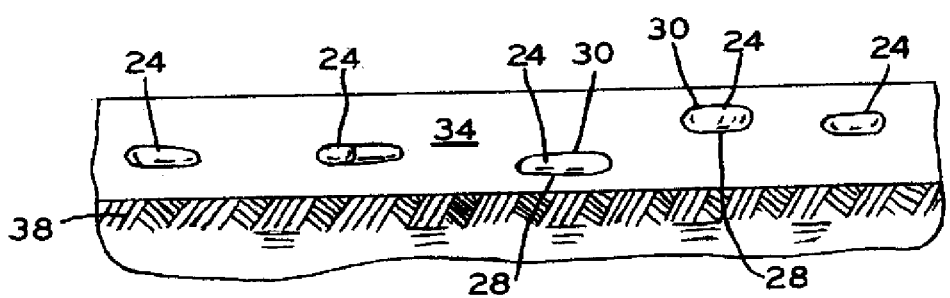
FIG_5
PRIOR ART
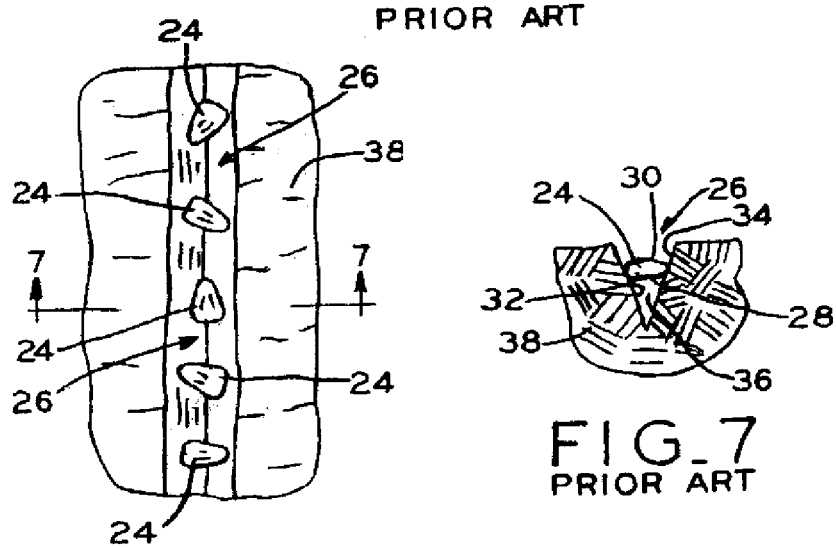
FIG_6
PRIOR ART
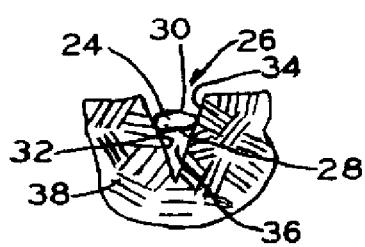
FIG_7
PRIOR ART

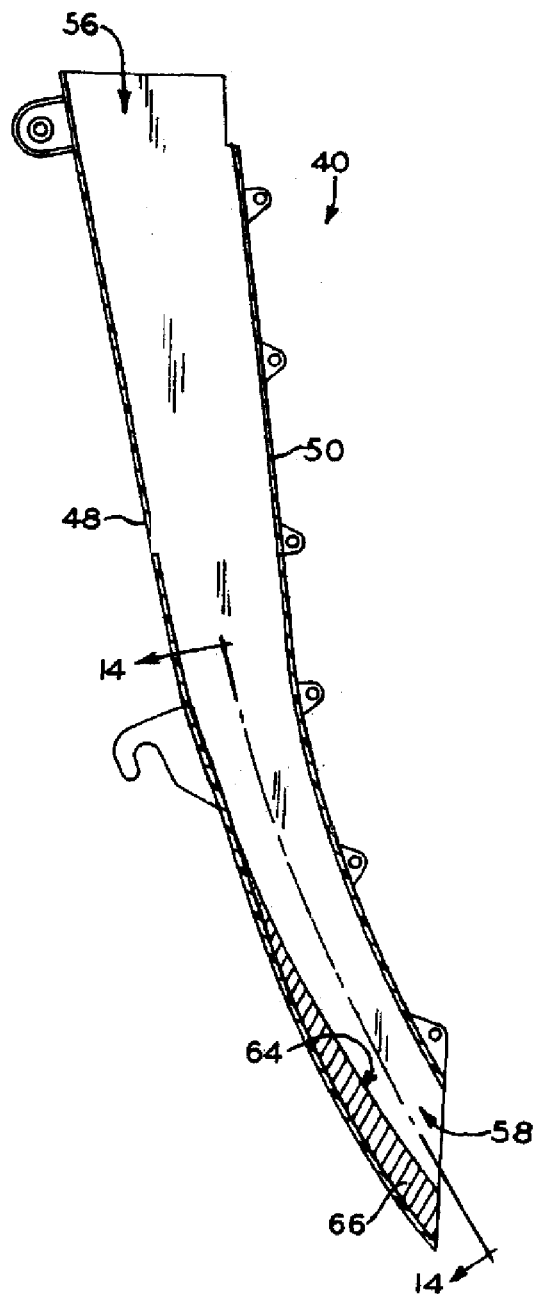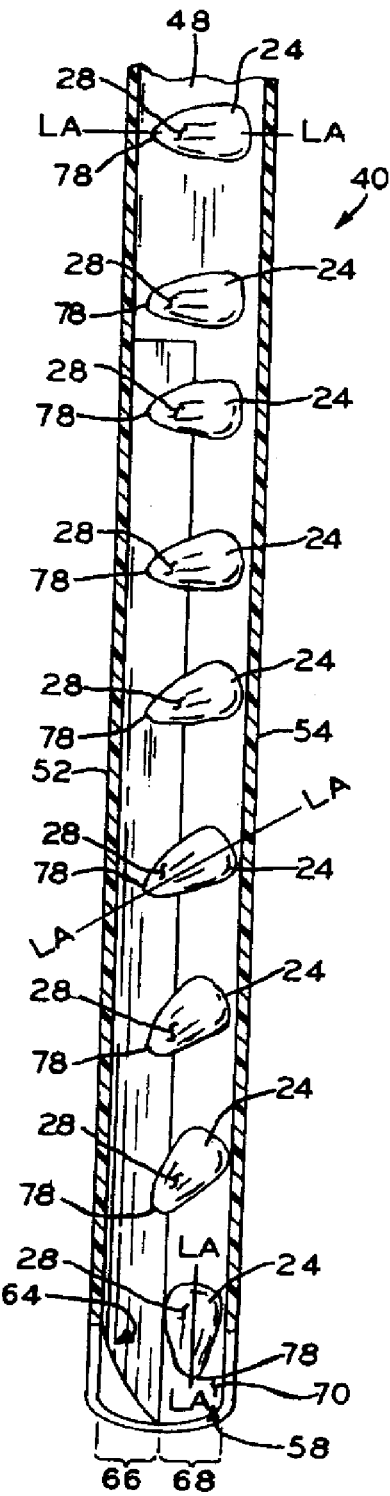
FIG_13
FIG_14

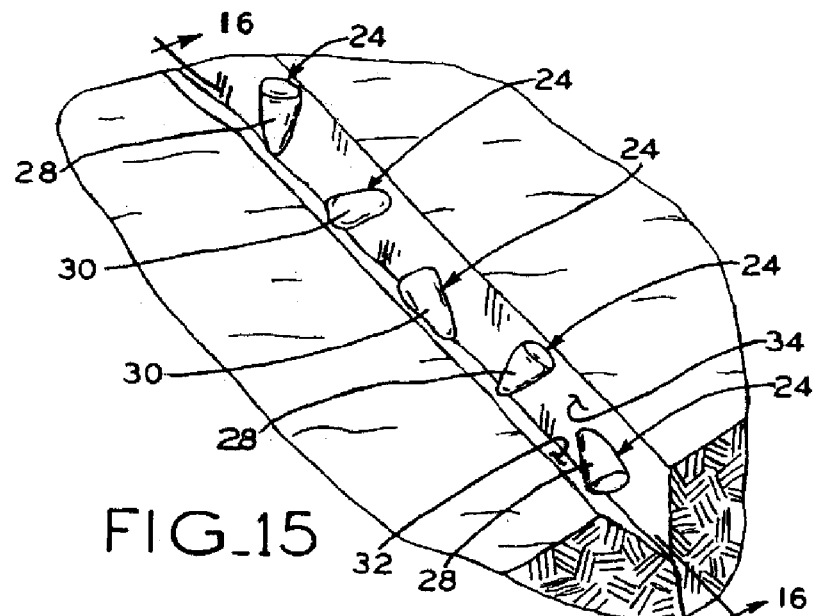
FIG_15
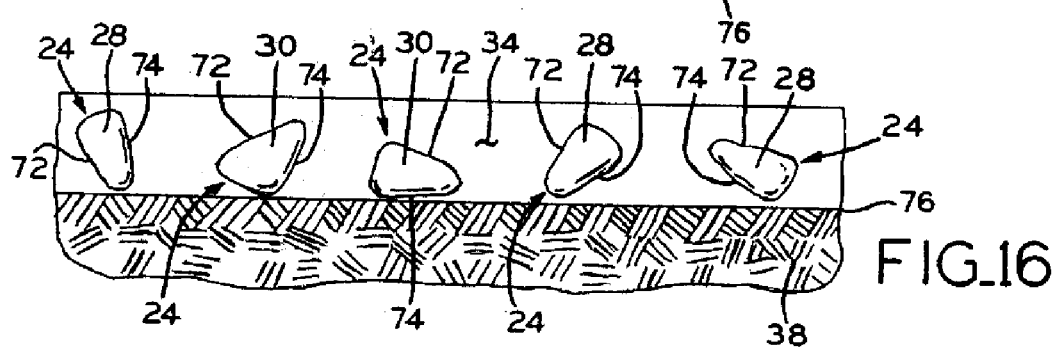
FIG_16
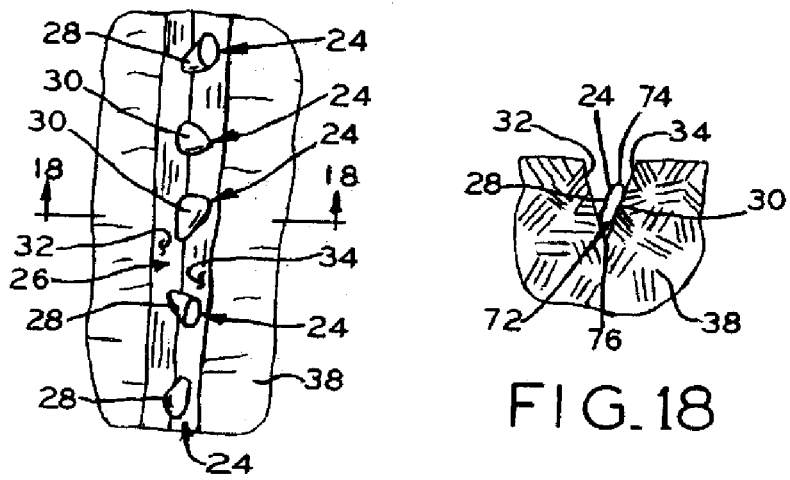
FIG_17
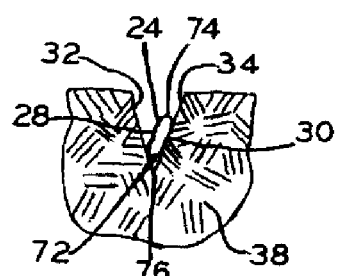
FIG_18